(12) United States Patent
Holmes et al.

(10) Patent No.: US 7,620,157 B2
(45) Date of Patent: Nov. 17, 2009

(54) SYSTEM FOR REQUESTING SERVICE OF A MACHINE

(76) Inventors: Andrew S. Holmes, 884 S. Greensgrove St., Orange, CA (US) 92866; Kevin D. Knoop, 13472 Jefferson St., Garden Grove, CA (US) 92844

( * ) Notice: Subject to any disclaimer, the term of this patent is extended or adjusted under 35 U.S.C. 154(b) by 765 days.

(21) Appl. No.: 10/820,917

(22) Filed: Apr. 8, 2004

(65) Prior Publication Data

US 2005/0008127 A1    Jan. 13, 2005

(51) Int. Cl.
*H04M 11/04* (2006.01)

(52) U.S. Cl. .................... 379/39; 221/6; 340/539.1; 369/24.01; 370/260; 370/338; 370/352; 370/401; 379/42; 379/47; 379/88.16; 379/88.26; 455/41.2; 700/244

(58) Field of Classification Search ............ 379/106.01, 379/67.1, 155, 39, 219, 42, 47, 88.16, 88.26; 340/506, 539.1; 399/81; 221/6; 369/24.01; 370/260, 338, 352, 401; 455/41.2; 700/244
See application file for complete search history.

(56) References Cited

U.S. PATENT DOCUMENTS

| | | | | | |
|---|---|---|---|---|---|
| 4,631,357 | A | * | 12/1986 | Grunig | 379/40 |
| 5,699,328 | A | * | 12/1997 | Ishizaki et al. | 369/24.01 |
| 5,706,976 | A | * | 1/1998 | Purkey | 221/6 |
| 5,708,223 | A | * | 1/1998 | Wyss | 73/865.9 |
| 5,844,808 | A | * | 12/1998 | Konsmo et al. | 700/244 |
| 5,941,363 | A | * | 8/1999 | Partyka et al. | 194/217 |
| 5,997,170 | A | * | 12/1999 | Brodbeck | 700/236 |
| 6,069,896 | A | * | 5/2000 | Borgstahl et al. | 370/401 |
| 6,195,243 | B1 | * | 2/2001 | Spencer et al. | 361/64 |
| 6,233,327 | B1 | * | 5/2001 | Petite | 379/155 |
| 6,430,268 | B1 | * | 8/2002 | Petite | 379/39 |
| 6,748,186 | B1 | * | 6/2004 | Skrainar et al. | 399/81 |
| 6,810,234 | B1 | * | 10/2004 | Rasanen et al. | 455/41.2 |
| 6,844,813 | B2 | * | 1/2005 | Hardman | 340/539.1 |
| 7,034,711 | B2 | * | 4/2006 | Sakatani et al. | 340/686.1 |
| 7,161,479 | B2 | * | 1/2007 | Sobol | 340/506 |

(Continued)

*Primary Examiner*—Gerald Gauthier
(74) *Attorney, Agent, or Firm*—Russo & Duckworth, LLP (57) ABSTRACT

A machine requiring periodic maintenance, such as a vending machine, is retrofitted to include an alert system for notifying a machine operator that the machine requires servicing. The alert system includes one or more sensors to detect default conditions, a voice recorder for storing one or more voice messages corresponding to default conditions, a transmitter for transmitting the voice messages to the machine operator, and a trigger connected to the one or more sensors and the transmitter for selectively initiating the transmission of appropriate voice messages in accordance with predetermined parameters. The voice messages are transmitted over the public switched telephone network (PSTN) to be heard by the machine operator or stored on the machine operator's voice answering system. The transmitter may be a simple auto dialer connected by wires to a nearby phone jack. However, in a preferred embodiment, the transmitter is constructed in similar manner to the transmitter of a cordless telephone in which the monitored machine includes a short range transmitter operating at 900 MHz or 2200 MHz for transmitting a voice message to a corresponding receiver connected to a nearby phone jack. The voice message is then transmitted over the PSTN to the machine operator. The alert system of the present invention may also include a clock connected to the trigger for causing the voice messages to be transmitted only a predetermined times of the day.

8 Claims, 6 Drawing Sheets

U.S. PATENT DOCUMENTS

| | | | |
|---|---|---|---|
| 7,221,746 B1* | 5/2007 | Onken et al. | 379/106.01 |
| 7,253,729 B2* | 8/2007 | Lastinger et al. | 340/539.1 |
| 2003/0108171 A1* | 6/2003 | Richardson et al. | 379/106.01 |
| 2003/0179746 A1* | 9/2003 | Moon et al. | 370/352 |
| 2004/0101122 A1* | 5/2004 | Da Palma et al. | 379/219 |
| 2004/0174969 A1* | 9/2004 | Malcolm et al. | 379/106.01 |

* cited by examiner

SYSTEM FOR REQUESTING SERVICE OF A MACHINE

BACKGROUND OF THE INVENTION

The present invention relates to machines which require periodic servicing. More particularly, the present invention relates to systems for providing notice to an machine operator that a machine needs servicing.

The present invention is believed to have application for servicing any machine which requires servicing or maintenance including vending machines, coin operated laundry machines, video games, car washes, etc. However, the invention is believed to have particular application for servicing coin operated vending machines. Accordingly, the invention is described with particularity for use in servicing vending machines, but the invention is not intended to be limited thereto. Moreover, the term "machine servicing" is intended to be understood in its broadest sense to include any type of required machine maintenance or inventory support such as the replacement or repair of components, and the removal of excess coins and dollar bills, or the replenishment of goods.

Vending is a low profit per item industry. A can of soda can cost around 30 cents and may be sold for 50 cents or maybe even 75 cents. The amount of profit from an average size vending account does not justify the expenses involved in setting up a central host computer, a constant connection or the expensive support equipment. Operators want to make sure that their machines are running and that they are making money. Unfortunately, most soda and snack vending machines currently in use do not have a system or structure to communicate with a vending operator about their status.

Recently, there have been attempts to provide alert systems for notifying machine operators that one or more of their machines require servicing. Most such vending alert systems available use a dedicated phone line, dedicated cell phone or a dedicated broadband Internet connection to communicate machine status. Unfortunately, most machine operators cannot afford such alert systems as a dedicated connection adds additional expense to the operating costs of a machine.

There have been numerous attempts to address alert system shortcomings. For example, U.S. Pat. No. 6,430,268 discloses an inventory control system for a vending machine. This system uses a digital transmission, with a controller using memory (RAM/ROM) for assigning a default code. The system calls a server-based computer and transmits digital data that must be decoded to provide the vending operator with the fault. The system senses an inventory low and out-of-stock condition, which is redundant information to the vending operator. This system also requires a payphone to be nearby and requires modifications to be made to the payphone to allow it to interface with this system. Payphones are usually privately owned, therefore an agreement with the phone company would need to be made prior to modification to the payphone.

Meanwhile, U.S. Pat. No. 5,117,407 discloses a machine system which uses a voice synthesizer. However, instead of being an alert system, the speech synthesizer is designed to talk to the customer. U.S. Pat. No. 5,678,172, describes an alert system providing two-way communication between the vending machine and the central control station. Similarly, U.S. Pat. No. 5,519,718 describes a system using a base station to send out queries to a vending machine and requires two-way communication. U.S. Pat. No. 5,544,784 also describes a system requiring a two-way pager communication between a central computer and the vending machines.

An additional expensive system is disclosed in U.S. Pat. No. 5,844,808 which uses a host computer system to analyze data transmitted in a digital format. Meanwhile, U.S. Pat. No. 6,462,644 discloses an alert system using a WAN (wide area network) and sends out a digital data stream to a central computer that tracks the data and builds a database from sales. U.S. Pat. No. 5,761,621 describes a digital system inventory control system that relays the current inventory state of the machine at all times.

Unfortunately, these foregoing systems are expensive and not readily adapted for retrofitting an existing vending machine. It is therefore an object of the present invention to provide a machine alert system that is inexpensive to manufacturer and can be used to retrofit existing vending machines.

It is an additional object of the invention to provide an alert system that does not require expensive communication systems or digital transmission equipment.

It is still an additional object of the invention to provide an alert system that does not require a monthly subscription fee.

SUMMARY OF THE INVENTION

The present invention addresses the aforementioned disadvantages by providing an alert system that transmits voice messages to a machine operator when the machine requires servicing. Advantageously, the alert system does not require the transmission of digital data, the use of a network controller, or two-way communication.

The alert system of the present invention is intended for a machine which requires periodic servicing. The alert system includes at least one sensor for detecting a machine condition, such as the a vending machine has a low inventory or has a broken component, such as a jammed coin receiver or broken light or broken cooling system. The alert system further includes a voice recorder for storing one or more messages that correspond to a machine condition. The message may include an alert as to a general fault condition, such as "Machine 1 requires servicing". Alternatively, the voice message may identify particular servicing requirements. For example, where the machine has a low inventory, a corresponding voice message may be, "Machine 1 has low inventory" or "Machine 1 requires additional Cola." Where an alternate machine has a broken component, the corresponding voice message may state, "Machine 15 has a jammed coin return", or "Machine 15 is not providing proper refrigeration." The alert system may include any number of messages and an unlimited variety of voice messages, dependent only on the number of sensors for detecting the machine conditions. Moreover, the recorder may store messages using any of numerous storage units known to those skilled in the art including magnetic tape, digital discs, RAM, ROM, etc.

The alert system of the present invention also includes a transmitter for transmitting the voice messages over the public switched telephone network (PSTN) to the machine operator. The transmitter may take various forms. For example, the transmitter may be a simple phone dialing system connecting the voice recorder by a phone wire to a conventional phone jack. This construction is considered preferred where the vending machine is in proximity to a phone jack. In an alternative embodiment of the invention, the transmitter is a wireless unit having a similar construction and operation to cordless phones found in many homes across the country. To this end, preferably, the transmitter includes a short range transmitter operating at standard commercial 900 MHz of 2200 MHz bands for sending voice signals to a receiver connected to a phone jack. The voice signals are then transmitted over the PSTN to the machine operator.

In addition to a machine sensor, voice message recorder and transmitter, the alert system includes a trigger for causing the voice messages to be transmitted to a predetermined telephone number upon the sensor detecting a predetermined machine event. For example, when a sensor detects that a vending machine has a low inventory, the trigger causes the recorder to play a pertinent prerecorded message and transmit the message to a predetermined phone number using the transmitter. Upon receipt of the voice message, the machine operator may answer the phone to hear the voice message in real time regarding machine condition. However, preferably, the machine operator has a voice answering system for receiving and recording the transmitted voice messages from one or more machines for playback at a later time.

In a still an additional preferred embodiment of the invention, the alert system includes a clock connected to the trigger. Preferably, the trigger is activated to send prerecorded voice messages at predetermined times of the day. Thus, the alert system of the present invention can be set up to send voice messages immediately upon the occurrence of predetermined machine condition, or the alert system can be set up to send voice messages only at predetermined times of the day, such as during or after regular business hours.

The alert system has been described for use in identifying conditions of a single vending machine. However, any number of machines may be monitored. Preferably, each vending machine includes a transmitter and recorder for storing messages. However, where vending machines are in close proximity to one another, the alert system may utilize multiple cordless phone transmitters but only a single cordless phone receiver and single phone jack for relaying messages over the PSTN to the machine operator.

It is therefore an object of the invention to provide a vending machine with a low cost alert/alarm system. The invention allows the vendor to make extra money by providing a notification of a machine fault or low inventory occurrences without the extra overhead of a dedicated connection and a monthly pay subscription or service fees to obtain machine information. This alert system does not use a network or other interconnections between machines, and the central data collection point consists of a single voice mailbox. Advantageously, the vending machine alert system is expandable from one machine to over 100 machines with a single voice mail inbox.

These and other features and advantages of the present invention will be appreciated by those skilled in the art from the following detailed description taken in conjunction with the drawings.

DETAILED DESCRIPTION OF THE INVENTION

While the present invention is susceptible of embodiments in various forms, as shown in the drawings, hereinafter be described the presently preferred embodiments of the invention with the understanding that the present disclosure is to be considered as an exemplification of the invention and it is not intended to limit the invention to the specific embodiments illustrated.

With reference to the Figures, the alert system of the present invention includes one or more sensors for detecting a machine condition, a recorder for storing prerecorded voice messages, a transmitter for transmitting the voice messages, and a trigger for activating the transmitter when predetermined conditions have occurred. The sensor 20 may be of any type known to those skilled in the art for detecting a machine condition, such as the a vending machine has low inventory or has a broken component, such as a jammed coin receiver or broken light or broken cooling system.

The recorder forms part of the interface circuit 22 and uses magnetic tape, digital discs, RAM, ROM, etc. to store one or more messages that correspond to a machine condition. The message may include an alert as to a general fault condition, such as "Machine 1 requires servicing". Alternatively, the voice message may identify particular servicing requirements such as, "Machine 1 has low inventory", or "Machine 1 requires additional Cola.", or "Machine 15 has a jammed coin return", or "Machine 15 is not providing proper refrigeration."

The transmitter (10, 14 & 16) for transmitting the voice messages over the public switched telephone network (PSTN) may also take various forms. For example, the transmitter may be a simple phone dialing system connecting the voice recorder 22 to a conventional phone jack. In an alternative embodiment of the invention, and as shown in the Figures, the transmitter (10, 14 & 16) is a wireless unit having a similar construction and operation to the conventional cordless phones. Accordingly, the transmitter preferably includes a short range transmitter 14 operating at standard commercial 900 MHz of 2200 MHz bands for sending voice signals to a receiver 16 connected to a phone jack. The voice signals are then transmitted over the PSTN 18 to the machine operator for real time feedback, or for recordation and later playback.

In addition to a machine sensor 20, voice message recorder and transmitter, the alert system includes a trigger for causing the voice messages to be transmitted to a predetermined telephone number. As shown in the Figures, a preferred trigger includes both a control circuit 24 and autodialer 10 which initiates the transmission of the recorded message stored in the interface circuit 22 after the sensor 20 detects a predetermined machine event. For example, when a sensor detects that a vending machine has a low inventory, the trigger (including control circuit 24 and autodialer 10) causes the recorder to play a pertinent prerecorded message and transmit the message to a predetermined phone number using the transmitter.

Figure 10:
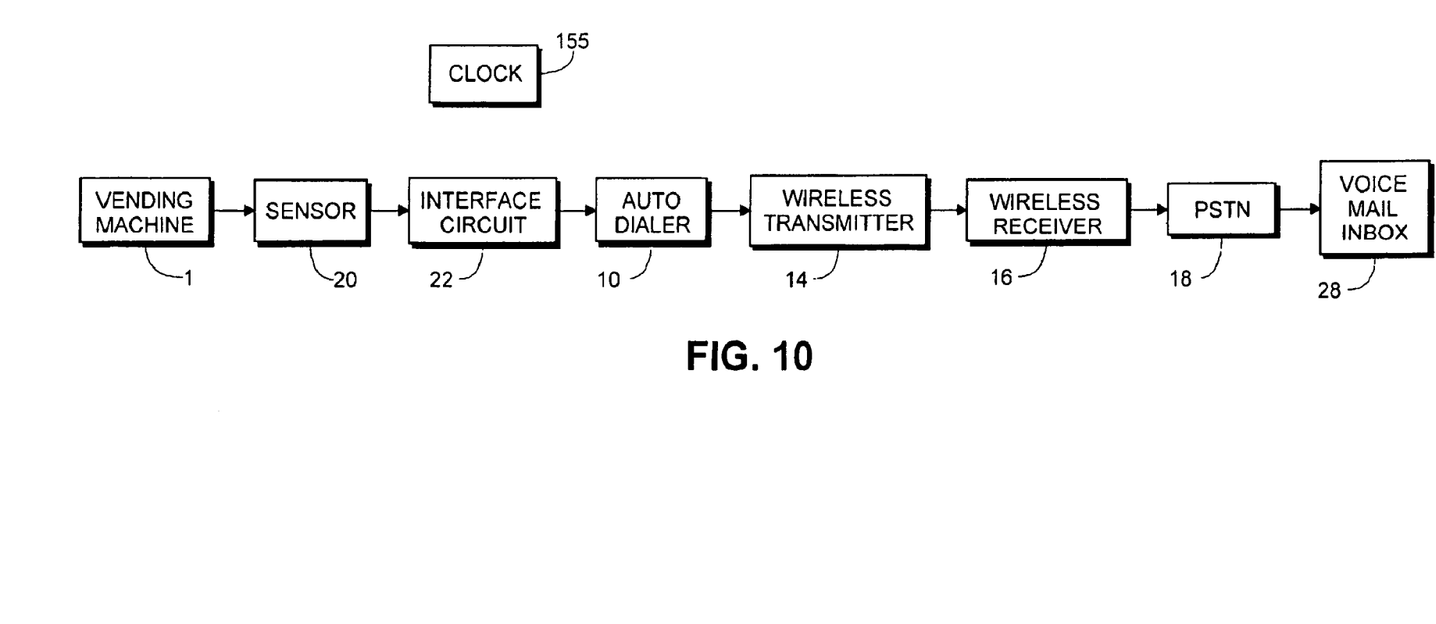
FIG. 10 is a block diagram illustrating an alert system of the present invention including the recording of voice messages in the machine operator's voice mail.
Figure 11:
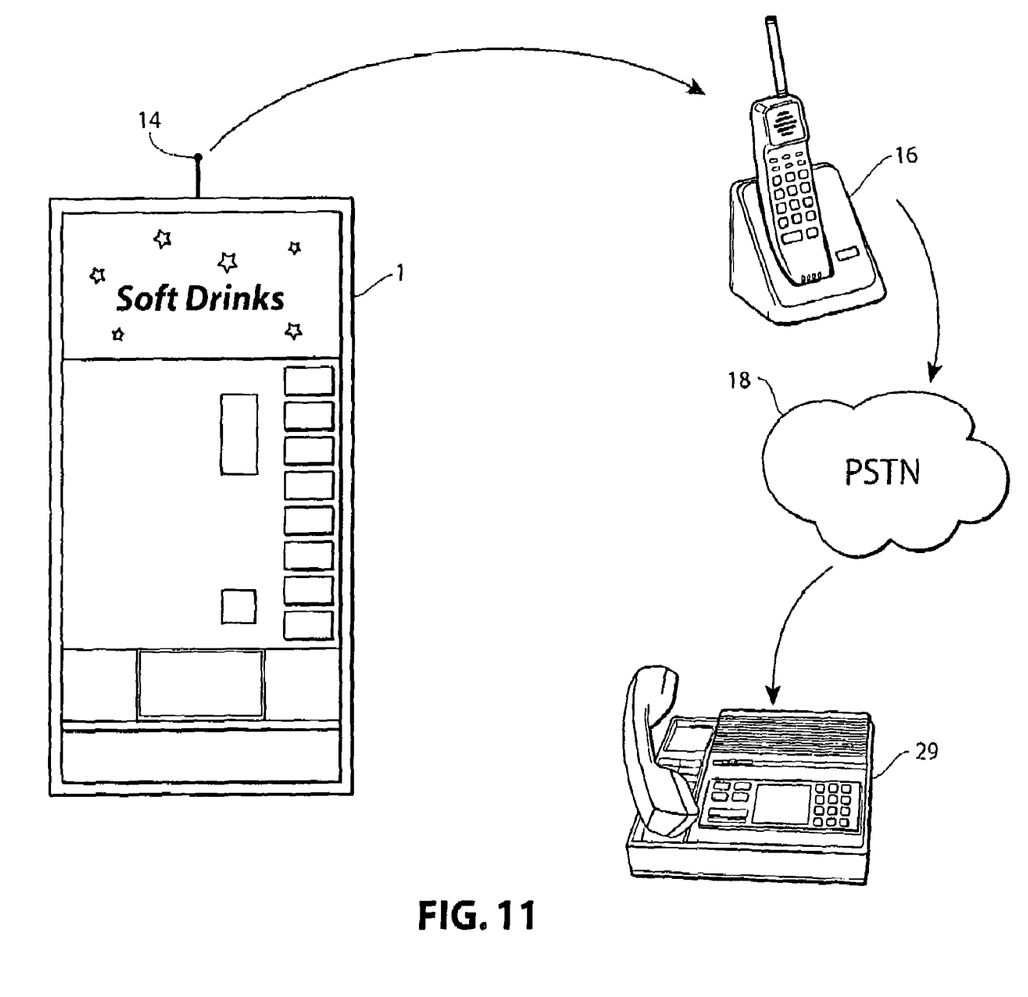
FIG. 11 is a diagram illustrating the transmission of voice messages from a vending machine to a machine operator.

Upon receipt of the voice message, the machine operator may answer the phone to hear the voice message regarding machine condition. However, as shown in FIGS. 10 and 11, preferably the machine operator has a voice answering system 29 for receiving and recording the transmitted voice messages from one or more machines for playback at a later time. The answering system 29 may also be of any type known to those skilled in the art. For example, the answering machine may be a conventional stand alone box which connects to a phone jack. Alternatively, the answering system 29 may take the form of an answering service which records voice mail messages.

In still an additional preferred embodiment of the invention, the alert system includes a clock 28 connected to the trigger. Preferably, the clock causes the trigger (24 & 10) to activate and send prerecorded voice messages at predetermined times of the day. More specifically, the clock allows the machine operator to cause the alert system to send voice messages immediately upon the occurrence of predetermined machine condition, or cause the alert system to send voice messages only at predetermined times of the day, such as during or after regular business hours. To this end, the clock 28 controls activation of the trigger so as to initiate the transmission of voice messages only at desired times, such as after business hours. Moreover, where the machine operator has many machines that are being monitored, each machine can be preprogrammed to send messages at different times of the day so that machine events in multiple machines does not result in numerous phone calls to the machine operator at the same time. As but one example, twelve machines can be programmed to call at five minute intervals over an hour period. This staggering of phone calls avoids a machine reaching a busy signal.

Figure 1:
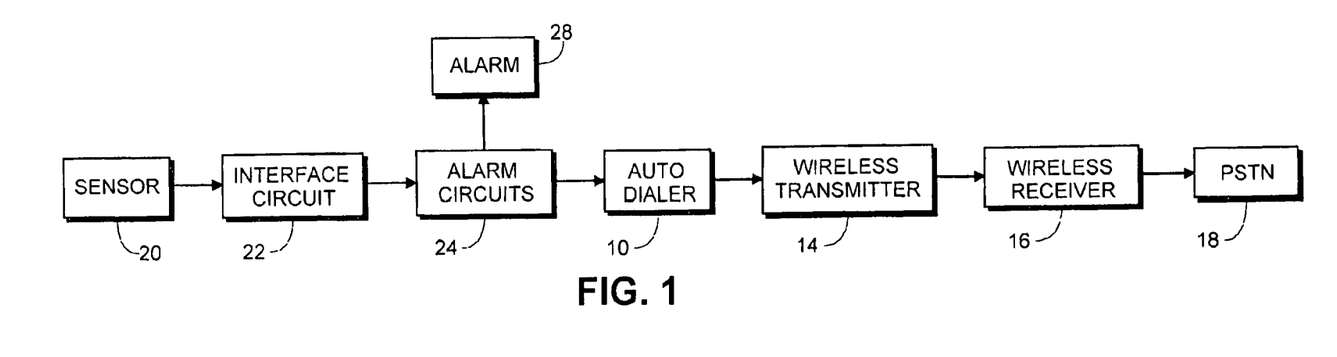
FIG. 1 is a block diagram for a single function vending machine alert system.

With reference to FIG. 1, the alert system of the present invention may include only one sensor for monitoring one machine. The single function vending alert system provides an alarm for any one function (20) and connects it to the telephone auto dialer (10) via an interface circuit (22). The alarm circuits provides timing impulses and resets for the single function (24). The auto dialer (10) places the call when the 24-hour alarm clock goes off (28) or if the real times switch on the control circuit (26) is in real time mode, the call is placed as the fault occurs. The auto dialer (10) can be connected directly into a land line phone jack (18) via a hardwired connection, or connect to a wireless base unit (16) located at the phone jack (18), and a remote unit (14) located in the vending machine with the alert system. The wireless base unit (16) and the remote unit (14) are similar to commercially available cordless phones.

Figure 2:
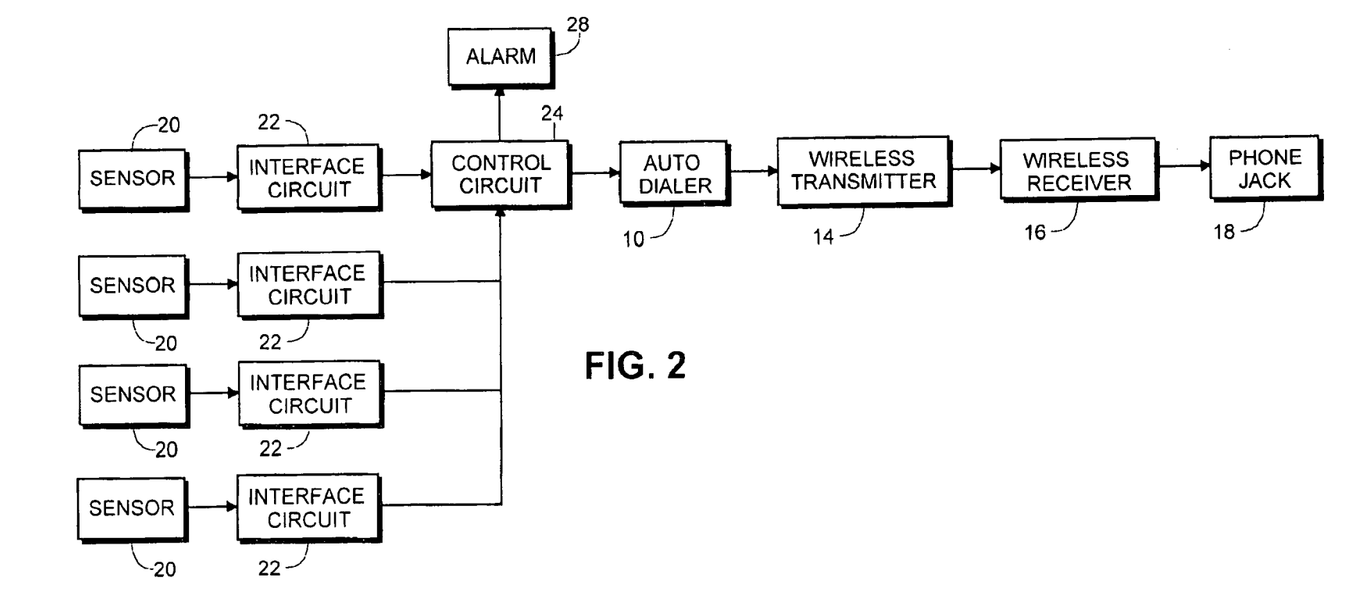
FIG. 2 is a block diagram for a multi-function vending alert system that provides the vending machine operator with a single fault message regardless of the fault occurrence.

With reference to FIG. 2, the alert system may provide the vending machine operator with a single fault message regardless of the fault occurrence. For this embodiment, the multi-function vending alert system provides a single fault message from the auto dialer (10) regardless of what fault has occurred. Each sensor (20) connects through its own interface circuit (22), and then into an alarm circuit (24) to provide timing pulses and resets for the single associated function sensor (20) to the control circuit to allow one alarm to trigger, then reset that specific alarm. The vending alert system allows the machine to place another call from the same machine with a different fault alert, or by activating an external toggle switch. The machine places only one call until the existing fault is cleared. The auto dialer (10) places the call when the 24-hour alarm clock goes off (28) or if the real times switch on the control circuit (26) is in real time mode, the call is placed when the fault occurs. The auto dialer (10) can be connected directly to the landline phone jack (18) via a hard wired connection, or connect through a wireless phone system with a base unit (16) located at the phone jack (18), and a remote unit (14) located in the vending machine alert system. The wireless base unit (16) and remote unit (14) are similar to commercially available cordless phones.

Figure 3:
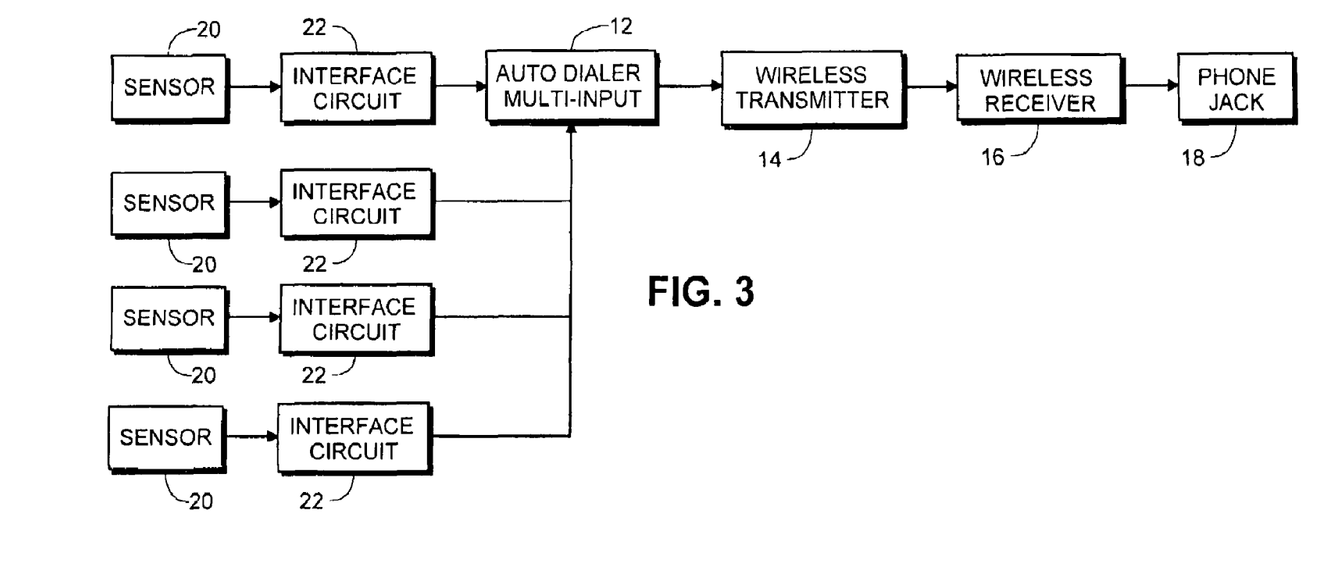
FIG. 3 is a block diagram for a multi-function vending alert system that provides the vending operator with a different fault message for each vending machine failure.

Alternatively, with reference to FIG. 3, a multi-function vending alert system provides the vending operator with a different fault message for each vending machine failure, for example, a vending machine 1 has a bad bill validator. The multi-function multi unit alerts system provides the vending operator with a specific fault message for each fault alert. Each sensor (20) proceeds through its own interface circuit (22), and then into the multiple inputs of the auto dialer (12). The alarms provide a brief fault description message with the specific fault condition from the auto dialer (12). Each sensor (20) connects through its own interface circuit (22), and then into an alarm circuit (24) to provide timing pulses and resets for the single associated function sensor (20) to a control circuit to allow one alarm to trigger, then reset that specific alarm. The vending alert system allows the machine to place another call from the same machine with a different fault alert, or by activating the external toggle switch connected to the alarm circuit. The machine only places one call until the existing fault is cleared. The auto dialer (12) can be connected directly to the landline phone jack (18) via a hardwired connection, or connect through a wireless phone system with a base unit (16) located at the phone jack (18), and a remote unit (14) located in the vending machine with the alert system. The wireless base unit (16) and remote unit (14) are similar to commercially available cordless phones.

Figure 4:
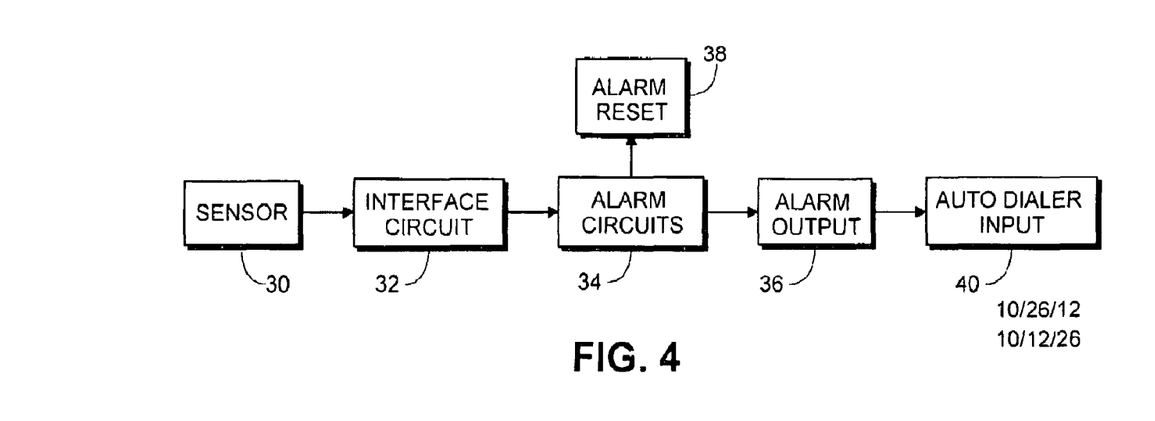
FIG. 4 is a block diagram for the selection low inventory function.

With reference to FIG. 4, alternative constructions of the present invention may provide alert notification. In an alternative embodiment, the selection low alarm circuit utilizes a sensor switch (30) that is attached to the vending machine with either magnets or other viable means, and is set at a level to allow enough time for the vending operator to receive the low product alert call before the machine runs out of a specific selection. The interface circuit (32) triggers when the sensor switch (30) has been in the low status after a preset time. The alarm circuit (34) triggers the alarm output (36) to provide a timed output to drive the auto dialer alarm input. The alarm output is connected to either the auto dialer input (40), or into a control circuit for a single message with multiple faults alert system. The alarm reset (38) shuts off the alarm circuits after a preset time to save power and allow other fault message to trigger the auto dialer if applicable.

Figure 5:
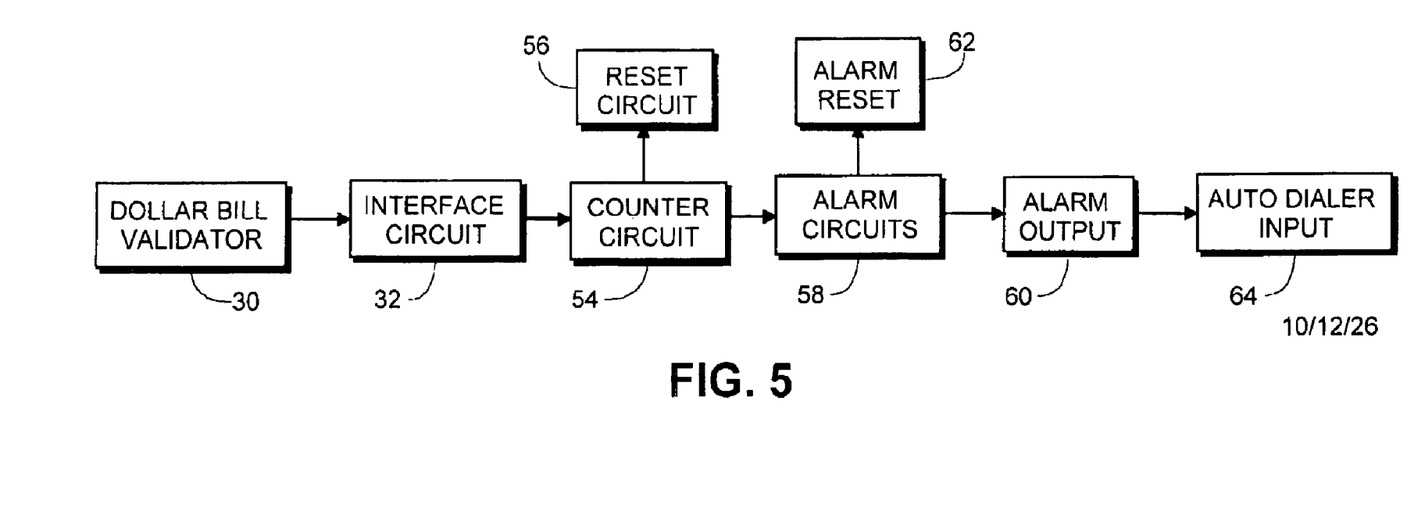
FIG. 5 is a block diagram illustrating an alert system of the present invention which notifies the vending machine operator when there is a failure with the dollar bill validator.

With reference to FIG. 5, the alert system of the present invention may be used to notify the vending machine operator when there is a failure with the dollar bill validator. The dollar bill validator alert system to the existing dollar bill validator (50) by connecting to an existing LED alarm output. The interface circuit (52) provides an isolated input from the dollar bill validator. The counter circuit (54) counts the number of times the dollar bill unit (50) flashes, and interprets an alarm condition and trigger the alarm circuit (58). The reset circuit (56) then resets the counter circuit (54) at a preset interval so that the counter circuit does not give false alarms. The alarm circuit (58) provides a timed output to drive the alarm output (60). The alarm output (60) is connected to either the auto dialer input (64), or into a control circuit (26) for a single message with multiple faults alarm system. The alarm reset (62) shuts off the alarm circuits (58) after a preset time to save power and allow other fault message to trigger the auto dialer (10, 12) if applicable.

Figure 6:
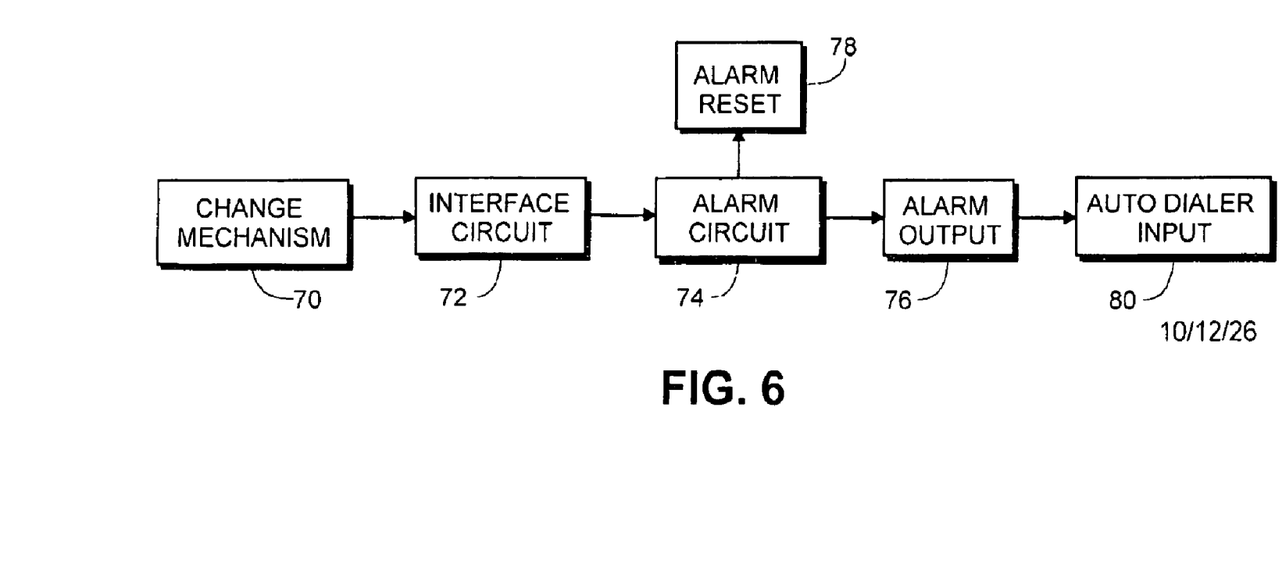
FIG. 6 is a block diagram illustrating an alert system of the present invention which notifies the vending machine operator when there is a failure with the coin mechanism.

With reference to FIG. 6, in an additional embodiment of the invention, the alert system notifies the vending machine operator when there is a failure with the coin mechanism. The change mechanism alarm circuit (FIG. 6) is wired to the existing change mechanism (70) by connecting to an existing circuit. The interface circuit (72) provides an isolated in put from the dollar bill validator. The counter circuit counts the number of times the unit flashes, and interprets an alarm condition. The reset circuit resets the counter at a preset interval so that the counter circuit does not give false alarms. The alarm circuit (74) then provides a timed output to drive the alarm output (76). The alarm output (76) is connected to either the auto dialer input (80) or into a control circuit for a single message with multiple faults alarm system. The alarm reset shuts off the alarm circuits after a preset time to save power and allow other fault messages to trigger the auto dialer if applicable.

Figure 7:
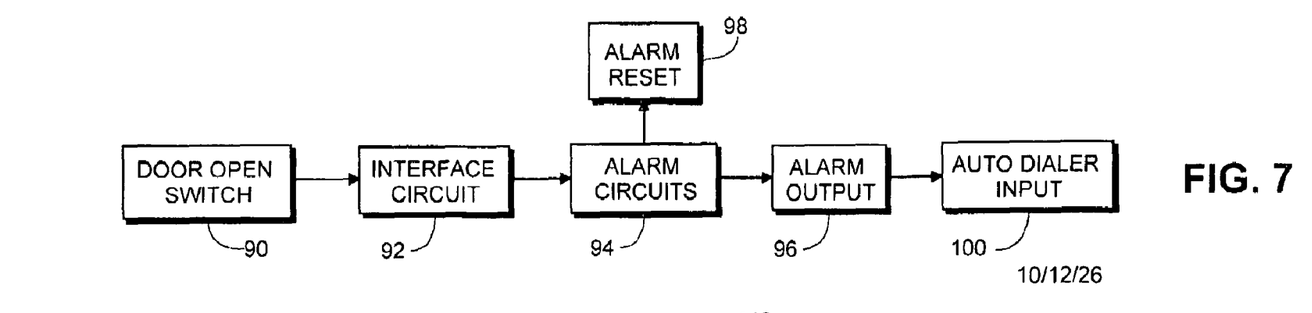
FIG. 7 is a block diagram illustrating an alert system of the present invention which alerts the vending machine operator if the door is left open.

In still an additional embodiment of the invention, the alert system alerts the vending machine operator if a door is left open. With reference to FIG. 7, the alert system includes a door open circuit which utilizes a sensor switch (90) that is attached to the door of the vending machine, and uses either optical, magnetic or mechanical switches to trigger when the door is opened. The interface circuit (92) trigger when the door open switch has been opened, and there is no delay between the door opening and alarm, unless the auto dialer is on a timed mode. The alarm circuit (94) provides a timed output to drive the alarm output (96). The alarm output is connected to either the auto dialer input (100), or into a control circuit (26) for producing a single message with a multiple fault alert system. The alarm reset (98) then shuts off the alarm circuits (94) after a preset time to save power and allow other fault messages to trigger the auto dialer if applicable.

Figure 8:
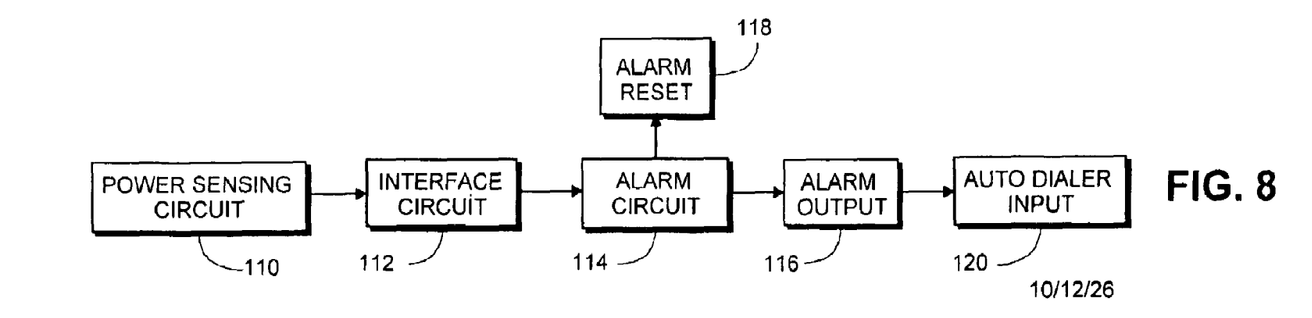
FIG. 8 is a block diagram illustrating an alert system of the present invention which alerts the vending machine operator if the power is shut off to the machine.

In still a further embodiment of the invention, the alert system alerts the vending machine operator if the power is shut off to the machine. With reference to FIG. 8, the alert system includes a power off sensing circuit which utilizes the sensing circuit (110) to detect the loss of power. The power off sensor connects to the interface circuit (112) and then to the alarm circuit. The alarm circuit triggers the alarm output (116), and the alarm-reset circuit (118) resets the alarm condition. The auto dialer input (120) connects to the auto dialer (10, 12) or control circuit (26) and initiates the transmission of a voice message to the machine operator.

Figure 9:
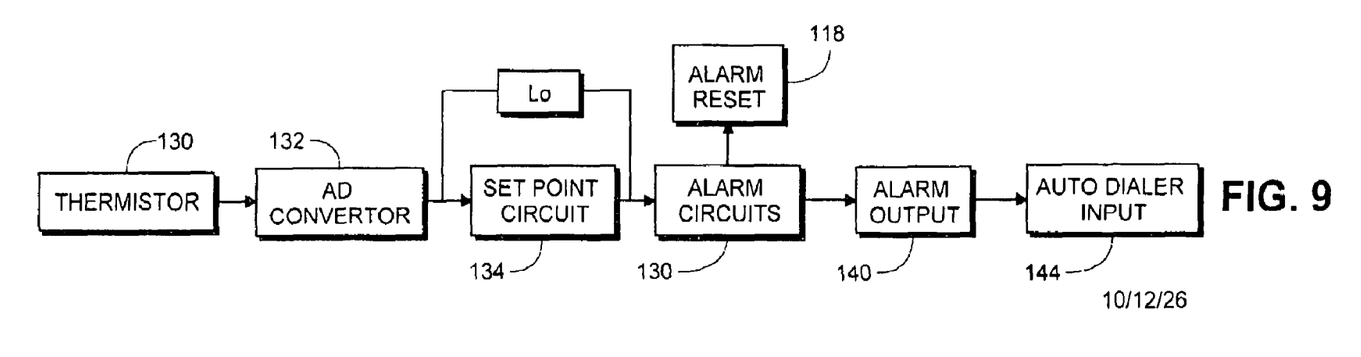
FIG. 9 is a block diagram illustrating an alert system of the present invention which alerts the vending machine operator if the machine is not maintaining the appropriate temperature.

In still an additional embodiment of the invention, the alert system alerts the vending machine operator if the machine is not maintaining the appropriate temperature. With reference to FIG. 9, the alert system includes a temperature over/under detection circuit (FIG. 9) which utilizes the thermistor (130) or other suitable device placed in the refrigerated section of the vending machine. The output of the temperature sensor connects to an analog or digital converter (132) to create a high temperature set point (134) and low temperature (136) digital set points. The set point circuits trigger once a set temperature has been exceeded. The alarm circuit (138) provides a timed output to drive the alarm output (140). The alarm output is connected to either the auto dialer input (10 or 12), or to a control circuit (26) for a single message with multiple faults alarm system. The alarm-reset circuit (142) disables the alarm circuits after a preset time to save power and allow other fault messages to trigger the auto dialer if applicable.

With reference to FIG. 10, in still an additional embodiment, a vending machine (150) is retrofitted with sensors (152) to determine faults. The sensors (152) can be from 1-X sensors, covering selection low, dollar bill validator faults, change mechanism fault, door open, temperature low or high, power off and machine tilt, as well as any other sensors that can be added to the vending machine. The interface circuit (154) processes the fault sensors and triggers the auto dialer when the clock (155) goes off. The auto dialer (156) places a call through either a direct connection (158) or a wireless connection (158). The connection (160) is received at the other end of the wireless or hard line, and goes into a standard wall phone jack (162) and goes into a voice mail inbox (164). The vending operator (168) can use either a standard landline or cell phone (166) to call the voice mail inbox (164) and retrieve the fault message from the prior day. The vending operator (168) can then relay this information to the route operator (170) who can then send service personnel to the vending machine to refill inventory or make repairs.

Although the present invention has been described with reference to the preferred embodiments, workers skilled in the art will recognize that changes may be made in form and detail without departing from the spirit and scope of the invention. Therefore, the scope of the invention shall not be limited by the specification above. Having described our invention in such terms to enable those skilled in the art to make and use it, and having identified the presently preferred embodiments thereof,

We claim:

1. An alert system for requesting service of a machine which requires servicing comprising:
   a sensor for detecting a machine event;
   a recorder storing one or more pre-recorded audible voice messages, said audible voice messages corresponding to machine event;
   a transmitter for transmitting said audible voice messages over the public switched telephone network;
   a trigger for transmitting said audible voice messages to a predetermined telephone number using said transmitter upon said sensor detecting a predetermined machine event; and
   a receiver at the predetermined telephone number for receiving the audible voice messages transmitted over the public switched telephone network.

2. The alert system for requesting service of a machine of claim 1 wherein said transmitter leaves an audible voice-mail message with an answering system when transmitting said audible voice messages.

3. The alert system for requesting service of a machine of claim 1 further comprising a clock connected to said trigger, said trigger sending said audible voice messages corresponding to machine event at predetermined times of the day.

4. The alert system for requesting service of a machine of claim 3 further comprising:
   a plurality of sensors for detecting machine events at a plurality of machines;
   a plurality of recorders storing pre-recorded audible voice messages corresponding to machine events;
   a plurality of transmitters for transmitting the audible voice messages over the public switched telephone network;
   a plurality of triggers for transmitting the audible voice messages to a predetermined telephone number upon the sensor detecting a predetermined machine event; and
   a plurality of clocks connected to said triggers causing said triggers to send said audible voice messages corresponding to machine event at predetermined times of the day;
   said clocks staggering the transmission of audible voice messages from the plurality of machines to avoid busy signals.

5. A method of requesting service of a machine comprising the steps of:
provide an alert system including a machine sensor for detecting machine event, a recorder storing one or more pre-recorded audible voice messages, the audible voice messages corresponding to machine event, a transmitter for transmitting the audible voice messages over the public switched telephone network; a trigger for transmitting the audible voice messages to a predetermined telephone number using the transmitter upon the sensor detecting a predetermined machine event, and a receiver at the predetermined telephone number for receiving the audible voice messages transmitted over the public switched telephone network;
detecting a machine event with the machine sensor; and
transmitting an audible voice message to the receiver at the predetermined telephone number over the public switched telephone network, the audible voice message corresponding to the machine event;
receiving the audible voice message from the receiver by persons servicing the machine.

6. The method of requesting service of a machine of claim 5 further comprising the step of recording the telephone audible voice message on an answering system after the message has been transmitting an audible voice message to a predetermined telephone number.

7. The method of requesting service of a machine of claim 5 wherein the alert system includes a clock connected to the trigger, and the method of requesting service includes the step of transmitting the audible voice messages corresponding to machine event at predetermined times of the day.

8. The method of requesting service of a machine of claim 7 wherein the alert system includes a plurality of sensors for detecting machine events at a plurality of machines, a plurality of recorders storing pre-recorded audible voice messages corresponding to machine events, a plurality of transmitters for transmitting the audible voice messages over the public switched telephone network, a plurality of triggers for transmitting the audible voice messages to a predetermined telephone number upon the sensor detecting a predetermined machine event; and a plurality of clocks connected to said triggers causing said triggers to send said audible voice messages corresponding to machine event at predetermined times of the day, and the method of requesting service further comprises the step of:
staggering the transmission of audible voice messages from the plurality of machines to avoid busy signals.

* * * * *

UNITED STATES PATENT AND TRADEMARK OFFICE
CERTIFICATE OF CORRECTION

PATENT NO. : 7,620,157 B2
APPLICATION NO. : 10/820917
DATED : November 17, 2009
INVENTOR(S) : Holmes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1413 days.

Signed and Sealed this

Twenty-sixth Day of October, 2010

David J. Kappos
*Director of the United States Patent and Trademark Office*